United States Patent [19]

Chorvat et al.

[11] 3,887,567

[45] June 3, 1975

[54] 3-ALKOXY-2-AZAESTRATRIENES

[75] Inventors: Robert J. Chorvat, Arlington Heights; Pappo, Raphael, Skokie, both of Ill.

[73] Assignee: G. D. Searle & Co., Chicago, Ill.

[22] Filed: Aug. 10, 1973

[21] Appl. No.: 387,389

Related U.S. Application Data

[63] Continuation-in-part of Ser. No. 100,419, Dec. 21, 1970, abandoned.

[52] U.S. Cl.................. 260/289 AZ; 260/283 S X; 260/287 R; 260/348 C; 424/258

[51] Int. Cl.......................................... C07d 101/00
[58] Field of Search.............................. 260/289 AZ

*Primary Examiner*—Donald G. Daus
*Assistant Examiner*—Mary C. Vaughn
*Attorney, Agent, or Firm*—John A. Dhuey

[57] ABSTRACT

Derivatives of the 3-keto-2-oxaandrostane family are appropriately reacted to yield 3-alkoxy-2-azaestratrienes and intermediates thereto, which compounds display valuable pharmacological e.g. antiviral, anti-leukemic and lipid-mobilizing, properties.

11 Claims, No Drawings

3-ALKOXY-2-AZAESTRATRIENES

This application is a continuation-in-part of our co-pending application Ser. No. 100,419, filed Dec. 21, 1970, now abandoned.

The present invention is concerned with the general class of azasteroids, and more particularly, with 3-alkoxy-17-oxygenated-2-azaestratrienes. The compounds specifically contemplated can be represented by the structural formula

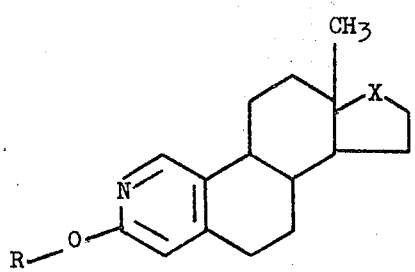

wherein R is a lower alkyl or cycloalkyl group and X represents a carbonyl group or a group of the formula

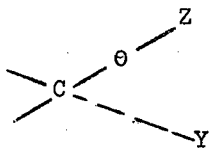

with Y being hydrogen, a lower alkyl, a lower 1-alkynyl or a propadienyl group and Z being hydrogen or a lower alkanoyl group. The lower alkyl groups intended herein are methyl, ethyl, propyl, butyl, pentyl, hexyl, heptyl, and the corresponding branched-chain isomers. The cycloalkyl groups represented herein have 4–8 carbon atoms inclusive and are illustrated by cyclobutyl, cyclopentyl, cyclohexyl, cycloheptyl and cyclooctyl. Examples of the lower alkanoyl groups depicted in the above formula are formyl, acetyl, propionyl, butyryl, valeryl, caproyl, heptanoyl and the branched-chain isomers thereof. The lower 1-alkynyl groups represented by the above formula are ethynyl, propynyl, butynyl, pentynyl, hexynyl, heptynyl and the branched-chain isomers derived therefrom.

Convenient starting materials which are used to produce the instant compounds are 3β,5α-diacetoxy-6β,19-epoxyandrostan-17-one and 17β-hydroxy-2-oxaestra-4,9-dien-3-one. Preparation of these compounds has been fully described in U.S. Pat. No. 3,176,014 and 3,405,141, respectively.

A preferred method of manufacturing the novel compounds of the present invention begins with the reduction, as with sodium borohydride in methanol, of 3β,5-α-diacetoxy-6β,19-epoxyandrostan-17-one to afford 6β,19-epoxyandrostane-3β,5α,17β-triol 3,5 diacetates. Subsequent benzoylation with benzoyl chloride in pyridine yields 6β,19-epoxyandrostane-3β,5α17β-triol 3,5-diacetate, 17-benzoate, which upon selective hydrolysis with methanolic hydrogen chloride, gives 6β,19-epoxyandrostane-3β,5α,17β-triol 5-acetate, 17-benzoate. This compound is the oxidized with chromic acid to yield 5α-acetoxy-17β-benzoyloxy-6β,19-epoxyandrostan-3-one. Further reaction in tertiary-butyl alcohol with potassium tertiary-butoxide and a catalytic amount of hexamethylphosphoramide under oxygen pressure results after hydrolysis, in 6β,19-epoxy-2,17β-dihydroxy-androsta-1,4-dien-3-one which yields, on ozonolysis in ethyl acetate at −650°, 6β,19-epoxy-1,17β-dihydroxy-2-oxaandrost-4-en-3-one.

The treatment of 6β,19-epoxy-1,17β-dihydroxy-2-oxaandrost-4-en-3-one with an alkanoic acid, such as formic acid, and its ammonium salt, such as ammonium formate, at about 125° with refluxing, yields a substance which upon subsequent refluxing with methanol and sodium hydroxide gives 6β,19-epoxy-17β-hydroxyl-2-azaandrost-4-en-3-one. Acylation, as typified by the reaction with acetic anhydride in pyridine, gives the corresponding 17-ester, and cleavage of the epoxy substituent is accomplished by reduction with zinc dust and cupric acetate in an aqueous acetic acid and ethanol solution. The resulting 17β-acetoxy-19-hydroxy-2-azaandrost-5-en-3-one is isomerized in piperidine and glacial acetic acid, with refluxing, to yield 17β-acetoxy-19-hydroxy-2-azaandrost-4-en-3-one. Oxidation of the 19-hydroxy group to the 10-carboxyl group is conveniently accomplished with aqueous chromic acid in an acetic acid and acetone mixture, and subsequent decarboxylation by refluxing in pyridine and acetic acid gives 17β-acetoxy-2-azaestr-5(10)-en-3-one. Bromination in chloroform with bromine in carbon tetrachloride affords the corresponding 5α,10β-dibromo compound and dehydrobromination at room temperature in pyridine upon addition of piperidine yields 17β-acetoxy-2-azaestra-1(10), 4-dien-3-one.

The above-mentioned 17-alkanoyloxy intermediates, e.g. 17β-acetoxy-2-azaestra-1(10),4-dien-3-one, can also be conveniently prepared by a series of steps beginning with the catalytic isomerization of the alternate starting material, 17β-hydroxy-2-oxaestra-4,9-dien-3-one, with palladium-on-carbon catalyst in ethanol with sodium acetate added, to provide the 1(10),4-diene isomer. the 2-oxa-compound, 17β-hydroxy-2-oxaestra-1(10),4-dien-3-one, can then be converted to the 2-aza-compound, 17β-hydroxy-2-azaestra-1(10),4-dien-3-one, by reacting the 2-oxa-compound with an alkanoic acid, such as acetic acid, and its ammonium salt with subsequent refluxing of the resulting residue in methanol and sodium hydroxide. Subsequent acylation, e.g. with acetic anhydride in pyridine, gives the desired intermediates, e.g. 17β-acetoxy-2-azaestra-1(10),4-dien-3-one. The 3-alkoxy derivatives, such as 3-methoxy-2-azaestra-1,3,5(10)-trien-17β-ol 17-acetate, are then produced by reacting the above intermediate with silver carbonate and an alkyl iodide, e.g. methyl iodide, in benzene.

An alternate route to the preparation of the 3-alkoxy-2-azaestratrienes is the oxidation of the hereinbefore mentioned intermediate 17β-hydroxy-2-oxaestra-1(10),4-dien-3-one with an appropriate oxidizing agent, such as aqueous chromic acid, in a solvent such as acetone to produce 2-oxaestra-1(10),4-diene-3,17-dione. Subsequent treatment of this compound with an alkanoic acid, such as acetic acid, and the ammonium salt of the acid, with refluxing at about 125°, yields the 2-azaestra-1(10),4-diene-3,17-dione. Further reaction with silver carbonate and an alkyl iodide, e.g. methyl iodide, in benzene gives the 3-alkoxy compounds, e.g. 3-methoxy-2-azaestra-1,3,5(10)-trien-17-one. The 17α-alkynyl derivatives can then be produced forthwith by the addition of an alkyne to a solution of tetrahydrofuran and ethanol containing powdered potassium hydroxide and the steroid under a nitrogen atmosphere at about 0°. When acetylene is used, the resultant product is 17α-ethynyl-3-methoxy-2-azaestra-1,3,5(10)-trien-17β-ol.

Treatment of the 17-ketone azaestratrienes with an alkyl Grignard reagent conveniently yields the 17α-alkyl derivatives. One such example is the reaction of 3-methoxy-2-azaestra-1,3,5(10)-trien-17-one with methyl magnesium bromide in tetrahydrofuran, thus affording 3-methoxy-17α-methyl-2-azaestra-1,3,5(10)-trien-17β-ol.

The instant 3-cycloalkyloxy compounds encompassed by this invention are prepared in a manner similar to that described for the 3-alkoxy derivatives by substituting the appropriate cycloalkyl iodide in place of the alkyl iodide. For example, contacting 2-azaestra-1(10),4-diene-3,17-dione with silver carbonate and cyclopentyl iodide in benzene affords 3-cyclopentyloxy-2-azaestra-1,3,5-(10-trien-17-one.

The 17α-propadienyl derivatives of this invention are produced from the corresponding 17-keto compounds by reaction with 3-tetrahydropyran-2'-yloxyprop-1-ynyl magnesium bromide followed by reaction, typically with lithium aluminum hydride, of the resulting propynyl carbinol. Specifically, 3-methoxy-2-azaestra-1,3,5(10)-trien-17-one is contacted with 3-tetrahydropyran-2'-yloxypropy-1-ynyl magnesium bromide and the resulting propynyl carbinol is allowed to react with lithium aluminum hydride to yield 3-methoxy-17α-propadienyl-2-azaestra-1,3,5(10)-trien-17β-ol.

The novel compounds of the present invention possess valuable pharmacological properties, as is evidenced by their ability to mobilize lipids from storage depots into the blood stream, their anti-viral activity and their anti-leukemic activity.

The anti-viral utility is demonstrated by the fact that they inhibit the growth of influenza virus type A (strain 575) as determined by the following test procedure.

Cell cultures of primary Rhesus monkey kidney maintained in 25 cc. plastic flasks and each containing test compound at concentrations of 625, 125, 25, 5 or 1 microgram per milliliter are prepared in pairs. These flasks, and an identical pair of flasks containing no test compound, are each inoculated with a dose of influenza virus type A (strain 575) previously shown to produce maximum hemadsorption and minimum cytopathogenic effects after a 24 hour incubation. Where the cultures contain test compound, the virus is added 1 hour after addition of the test compound to the culture. After 24 hours incubation of the cultures, the supernatant fluids are removed and 3.0 ml. of a 0.4% suspension of guinea pig erythrocytes are added to each flask. The flasks are then incubated at 4° in a horizontal position for 30 minutes. The flasks are rocked every 10 minutes during the incubation period. After this incubation, the red cell suspension is decanted from each flask. The flasks are washed twice with 3.0 ml. of phosphate buffer solution (pH 7.4) to remove unabsorbed red cells, and 3.0 ml. of distilled water is then added to lyse the adsorbed cells. The flasks are then further incubated at 37° and 30 minutes in a horizontal position and the flasks are rocked every 10 minutes. After this incubation, the fluid contents of the pairs of flasks are combined to form an assay unit and are placed at room temperature for 15–30 minutes to allow settling of the cellular debris. A pair of control flasks identical with the above, except for the absence of the test compound and virus inoculation, are run concurrently. The resulting hemoglobin solutions from each assay unit are then read for optical density in a Beckman spectrophotometer at about 415 millimicrons. A test compound is considered active if, at one of the tested levels, it reduces the optical density reading by at least 50% relative to the virus control.

The lipid-mobilizing properties of the instant compounds are evidenced by activity in the following assay:

A group of 8 male rats weighing 180–220 g. is maintained for 6 days on a sucrose enriched diet consisting of:

| Ingredient | % By Weight |
|---|---|
| Sucrose | 68% |
| Casein | 18% |
| Corn Oil | 5% |
| Salt | 4% |
| Vitamin | 2% |
| Cellulose | 3% |

On days 7 through 10 the animals are injected subcutaneously with the selected dose of the test compound and are maintained on the diet as described above. The test compound is administered in a suitable vehicle such as saline or corn oil in a volume of 1 ml./kg. of body weight. During the 10-day period the food consumption and body weights are measured and recorded. On the night of the 10th day the animals are fasted and plasma samples are taken the next morning for determination of cholesterol and triglyceride levels. These values are compared with those of a control group treated as above except for omission of the test compound. A compound causing a significant increase ($P$ 0.05) in both cholesterol and triglyceride levels is rated as an active lipid mobilizing agent.

Assays indicating anti-leukemic activity for the compounds of this invention were performed under the auspices of the Cancer Chemotherapy National Center.

The following examples illustrate in further detail the compounds which constitute this invention and the methods of their synthesis. However, the invention is not to be construed as limited thereby either in spirit or in scope as numerous modifications in materials and methods can be adopted without departing from the invention herein described. In these examples, temperatures are indicated in degrees Centigrade (°C.) and quantities of materials in parts by weight unless otherwise noted.

EXAMPLE 1

To a solution of 100 parts of 3β,5α-diacetoxy-6β,19-epoxyandrostan-17-one in 800 parts of methanol, cooled to approximately 5°, is added portionwise over a period of about 10 minutes, 6 parts of sodium borohydride. The heterogeneous mixture is then stirred at approximately 5° for about 90 minutes and the excess reagent is destroyed by the addition of glacial acetic acid. Removal of the solvent by distillation under reduced pressure affords a residual solution, which is diluted with water. The precipitated white solid is purified by recrystallization from aqueous ethanol to yield pure 6-β,19-epoxyandrostane-3β,5α,17β-triol 3,5-diacetate, melting at about 191°–192.5°. This compound is characterized further by infrared absorption peaks, in chloroform, at about 2,76, 5,77 and 8.00 microns. Nuclear magnetic resonance maxima are observed, in chloroform, at about 47, 120, 127 and 288 hertz.

EXAMPLE 2

To a solution of 50 parts of 6β,19-epoxyandrostane-3β,5α,17β-triol 3,5-diacetate in 450 parts of pyridine is added, in 1 portion, 30 parts of benzoyl chloride. The resulting reaction mixture is stirred at room temperature for about 3 hours, then is diluted with about 1200 parts of water. The initially oily substance which separates solidifies upon standing, then is collected by filtration, washed with water and dried to afford the crude product. Recrystallization of that material from methanol yields 6β,19-epoxyandrostane-3β5α,17β-triol 3,5-diacetate, 17-benzoate, melting at about 162°–165°. Infrared absorption maxima are observed, in chloroform, at about 5.78 and 8.00 microns and nuclear magnetic resonance maxima, in deuterochloroform, at approximately 60, 123, 131, 232 and 445–500 hertz.

EXAMPLE 3

To 800 parts of methanol containing approximately 5 parts of anhydrous hydrogen chloride is added 55 parts of 6β,19-epoxyandrostane-3β,5α,17β-triol 3,5-diacetate, 17-benzoate and the resulting reaction mixture is stirred at room temperature for about 4 hours. At the end of that time the acidic mixture is neutralized by the addition of triethylamine, then is diluted with about 1000 parts of water. The resulting crude product is dried and purified by recrystallization from methanol to yield 6β,19-epoxyandrostane-3β,5α,17β-triol 5-acetate, 17-benzoate, melting at about 212–214°. Infrared absorption maxima are displayed, in chloroform, at about 2.78, 5.78, 5.82 and 7.80 microns while nuclear magnetic resonance peaks are observed in deuterochloroform at about 59, 121, 127, 227 and 435–490 hertz.

EXAMPLE 4

To a solution of 49 parts of 6β,19-epoxyandrostane-3β,5α,17β-triol 5-acetate, 17-benzoate in 800 parts of acetone is added, at room temperature over a period of about 10 minutes, 31 parts of volume of an aqueous solution 8 N in chromium trioxide and 8 N in sulfuric acid. The resulting reaction mixture is stirred for about 15 minutes longer, at the end of which time the supernantant is separated by decantation. Dilution of that supernatant with water results in precipitation of the product, which is isolated by filtration, washed with water and dried to afford 5α-acetoxy-17β-benzoyloxy-6β,19-epoxyandrostan-3-one, melting at about 218°–219°. This compound displays infrared absorption maxima, in chloroform, at about 5.73, 5.82 and 7.80 microns and also nuclear magnetic resonance peaks at about 62, 126, 239 and 430–490 hertz.

EXAMPLE 5

To a solution of 44.4 parts of 5α-acetoxy-17β-benzoyloxy-6β,19-epoxyandrostan-3-one in 41.3 parts of tertiary-butyl alcohol containing 2.65 parts by volume of hexamethylphosphoramide is added 48.2 parts of potassium tertiary-butoxide and the resulting reaction mixture is shaken under several atmospheres of oxygen pressure for about 1 hour. The reaction mixture is then diluted with approximately 150 parts of water and allowed to stand at room temperature for about 16 hours, then is acidified with dilute hydrochloric acid. That acidic mixture is extracted with chloroform and the chloroform layer is separated, washed several times with water, dried over anhydrous sodium sulfate and stripped of solvent by distillation under reduced pressure, thus affording an oily residue. That material is dissolved in benzene and the benzene solution is washed with dilute aqueous sodium bicarbonate, then extracted with dilute aqueous sodium hydroxide. The latter alkaline extract is washed with chloroform, then is made acidic by the addition of dilute hydrochloric acid, thus affording the crude product as a precipitate. The latter acidic mixture is extracted with chloroform and the chloroform solution is washed with water, dried over anhydrous sodium sulfate and stripped of solvent by distillation under reduced pressure. The crude product obtained as a solid residue is purified by recrystallization from methanol, thus affording pure 6β,19-epoxy-2,17β-dihydroxyandrosta-1,4-dien-3-one, melting at about 199°–201°. This compound exhibits infrared absorption maxima, in chloroform, at about 2.75, 2.90 and 6.03 microns and nuclear magnetic resonance peaks in deuterochloroform, at about 53, 212, 219, 252, 259, 474 and 476 hertz.

EXAMPLE 6

A stream of ozone is passed through a solution containing 1 part of 6β,19-epoxy-2,17β-dihydroxyandrosta-1,4-dien-3-one in 81 parts of ethyl acetate at approximately −65° until a slight excess of ozone is present, as evidenced by the blue color of the solution. At the end of that time excess ozone is purged from the reaction mixture with nitrogen and the solution is allowed to warm to room temperature. Removal of the solvent by distillation under reduced pressure affords an oily residue. This residue is dissolved in a sufficient volume of 5% sodium bicarbonate solution, and then the solution is washed with chloroform to yield two phases which are separated. Acidification of the basic solution to about pH 4–6 with dilute hydrochloric acid solution affords 6β,19-epoxy-1,17β-dihydroxy-2-oxaandrost-4-en-3-one as a precipitate. Recrystallization from aqueous ethanol gives the pure material as a hydrate with a melting point of 143.5°–150.5°. The product is further characterized by nuclear magnetic resonance peaks at 59, 225, 233, 241, 255, 263, 270, 278, 291, 296, 368 and 391 hertz, an infrared peak at 5.78 microns, and ultraviolet absorbance at 226 millimicrons.

EXAMPLE 7

To a solution, heated to about 100°, of 487 parts of 98% formic acid and 350 parts of ammonium formate is added 36.5 parts of 6β,19-epoxy-1,17β-dihydroxy-2-oxaandrost-4-en-3-one, and the resulting solution is refluxed for 28–44 hours. After the reaction mixture is cooled, approximately 1000 parts of water is added to the solution to effect precipitation, and the precipitate is collected by filtration. The remaining aqueous mother liquors are then extracted with chloroform, and the combined extracts are washed with water, dried, and upon solvent removal under vacuum, an oil remains. The oil and precipitate are combined and taken up in 79.2 parts of methyl alcohol. To this is added 7.5 parts of sodium hydroxide in 50 parts of water. After refluxing for 1 hour, the volume of the above solution is reduced to about two-thirds of the original volume, and enough water added to precipitate the crude product. Pure 6β,19-epoxy-17β-hydroxy-2-azaandrost-4- en-3-one, melting at about 247°–250° with decomposition, is obtained upon recrystallization from ethyl alcohol. The product is characterized by nuclear magnetic resonance maxima at 57, 255–207 and 353 hertz and infrared absorption maxima at 2.77, 2.93, 5.90 and 6.03 microns.

EXAMPLE 8

To 18 parts of 6β,19-epoxy-17β-hydroxy-2-azaandrost-4-en-3-one in 98.2 parts of pyridine is added 54.1 parts of acetic anhydride. The mixture is stirred for 3¾ hours whereupon 800 parts of water is added with cooling to yield, upon filtering, 17β-acetoxy-6β,19-epoxy-2-azaandrost-4-en-3-one. Characteristics of this compound are nuclear magnetic resonance peaks at 52, 128, 208, 212, 220, 217, 225, 283, 288, 343 and 390 hertz and infrared spectrum with maxima at 2.92, 5.78, 5.90, 6.05 and 7.98 microns, and a melting point of 299°–302°.

EXAMPLE 9

To 4.8 parts of 17β-acetoxy-6β,19-epoxy-2-azaandrost-4-en-3-one under a nitrogen atmosphere is added, successively, 204 parts of ethyl alcohol, 78.7 parts of acetic acid, 75 parts of water, 52.5 parts of zinc dust, and 10.5 parts of cupric acetate. The resulting mixture is mechanically stirred while refluxing for 22 hours, after which time most of the ethyl alcohol is removed under reduced pressure and 250 parts of water is added. The precipitate is filtered, washed with water, and dried. Subsequent recrystallization from ethyl alcohol yields pure 17β-acetoxy-19-hydroxy-2-azaandrost-5-en-3-one which is characterized by nuclear magnetic resonance maxima at 52, 129.5, 233 and 351 hertz, infrared absorption peaks at 2.93, 5.79, 6.02 and 7.90 microns, and a melting point of 271°–273°.

EXAMPLE 10

To a solution of 14.0 parts of 17β-acetoxy-19-hydroxy-2-azaandrost-5-en-3-one in 103.2 parts of piperidine is added, dropwise at room temperature, 42 parts of glacial acetic acid. The reacting mixture is refluxed for 2 hours, and 500–600 parts of water is added with cooling to precipitate the crude product which is collected by filtration. Pure 17β-acetoxy-19-hydroxy-2-azaandrost-4-en-3-one is afforded by recrystallization from acetonitrile containing a few parts of acetic acid. It has a melting point of 265°–275° and is further characterized by a nuclear magnetic resonance spectrum with maxima at 52, 128, 193, 212, 226, 235, 242, 279 and 357 hertz, and infrared peaks at 2.93, 5.79, 5.95, 6.18 and 7.95 microns.

EXAMPLE 11

A solution of 17β-acetoxy-19-hydroxy-2-azaandrost-4-en-3-one in 63 parts of acetic acid and 237.6 parts of acetone is treated, at about 0°, with 12 parts by volume of 4 N aqueous chromic acid in portions over a period of 15 minutes so as to maintain the temperature between 0° and 5°. The reaction mixture is stirred for about 1 hour at which time a few parts of isopropanol and about 50 parts of water are added. The major portion of the solvent is stripped, and after addition of water, the solution is extracted with chloroform. The oil which forms after washing the extracts with water and sodium chloride solution, drying and filtering is triturated in ether to yield solid 17β-acetoxy-10β-carboxy-2-azaestr-4-en-3-one. Characterization of the product reveals infrared absorption maxima at 3.05, 5.85, 6.03, 6.23 and 8.00 microns and nuclear magnetic resonance maxima at 46, 122, 282, 341 and 470 hertz.

EXAMPLE 12

A mixture of 6.6 parts of 17β-acetoxy-10β-carboxy-2-azaestr-4-en-3-one, 34.4 parts of pyridine and 7.35 parts of glacial acetic acid is refluxed for 2 hours under a nitrogen atmosphere. After refluxing, water is added and the resulting precipitate is filtered and dried. Pure 17β-acetoxy-2-azaestra-5(10)-en-3-one is produced by recrystallization from ethanol. The infrared absorption maxima for the above compound are at 2.93, 5.79, 6.00 and 7.90 microns, and the maxima for the nuclear magnetic resonance spectrum are at 60, 124 174, 237 and 282 hertz.

EXAMPLE 13

To 0.4 part of 17β-acetoxy-2-azaestr-5(10)-en-3-one in 22.3 parts of chloroform is added 0.255 part of bromine dissolved in 4.8 parts of carbon tetrachloride and the solution is stirred for ½ hour. The majority of the solvent is evaporated and a few parts by volume of pentane is added. The solution is stirred, and the precipitate which forms is filtered to yield 17β-acetoxy-5α,10β-dibromo-2-azaestran-3-one. The nuclear magnetic resonance spectrum for this compound has maxima at 51, 73, 172, 190, 202, 220, 229, 281 and 388 hertz, while the infrared spectrum has absorption peaks at 2.93, 5.80, 5.95, and 7.95 microns.

EXAMPLE 14

To a mixture of 1.4 parts of 17β-acetoxy- 5α,10β-dibromo-2-azaestran-3-one in 19.6 parts of pyridine, 4.3 parts of piperidine is added, dropwise, over a 5 minute period. Stirring at room temperature for 2¾ hours is followed by the addition of about 74 parts of chloroform, washing with 1 N hydrochloric acid, addition of an additional 168 parts of chloroform, drying, and solvent removal under nitrogen and with heat. Recrystallization of the crude product from aqueous acetic acid affords 17β-acetoxy-2-azaestra-1(10), 4-dien-3-one, which has a characteristic nuclear magnetic resonance spectrum with maxima at 61, 136, 190, 295, 428 and 480 hertz, and an infrared absorption spectrum with maxima at 2.93, 5.78, 6.01, 6.16 and 7.90 microns. The product also absorbs weakly in the ultraviolet spectrum at 306 and 231 millimicrons.

EXAMPLE 15

To a mixture of 2.0 parts of 17β-acetoxy-2-azaestra-1(10), 4-dien-3-one in 132 parts of benzene is added successively 1.0 part of silver carbonate and 2.7 parts of methyl iodide. The resulting solution is refluxed in darkness for 22 hours and then filtered through diatomaceous earth. The solvent is removed to yield an oil, which when recrystallized from methanol, yields pure 3-methoxy-2-azaestra-1,3,5,(10)-trien-17β-ol 17-acetate. This compound exhibits a melting point of 102.0°–104.5°, peaks at 50, 123, 168, 233, 286 and 480 hertz in the nuclear magnetic resonance spectrum, an infrared spectrum with absorption peaks at 5.80, 6.22, 6.70, 7.30 and 7.90 microns, and an ultraviolet spectrum with absorption at at 277.5 and 287 millimicrons. It is represented by the following structural formula

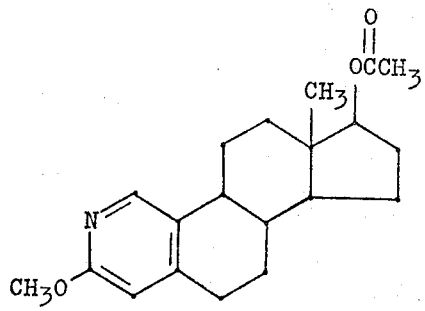

EXAMPLE 16

To 25 parts of 5% palladium-on-carbon catalyst in 816 parts of ethyl alcohol under a nitrogen atmosphere is added 50 parts of 17β-hydroxy-2-oxaestra-4,9-dien-3-one and 33 parts of sodium acetate. The stirred mixture is then brought to reflux temperature and held there for 2 ½ hours before filtering. After the addition of several parts of water to the filtrate, the ethyl alcohol is removed under reduced pressure and 1009 parts of 1% sodium hydroxide solution is added to the residue. After extraction of the aqueous solution with chloroform, the combined organic extracts are washed with a 5% sodium bicarbonate solution and with water, dried, and the solvent removed. The pure product, 17β-hydroxy-2-oxaestra-1(10), 4-dien-3-one, is obtained upon recrystallization from ethanol and is distinguished by an infrared spectrum with absorption peaks at 2.76, 5.77, 6.10 and 6.50 microns and nuclear magnetic absorption maxima at 48, 225, 364 and 439 hertz. Absorption is also found in the ultraviolet spectrum at 298 millimicrons.

The previously separated aqueous hydroxide solution is acidified with dilute hydrochloric acid to a pH of about 3 and then extracted with chloroform. The combined extracts then are extracted with a 5% sodium bicarbonate solution, washed with water, and dried. After solvent removal the pure compound, 17β-hydroxy-2-oxaestra-5,7,9-trien-3-one, is recrystallized from benzene. The compound is characterized by a melting point of 21.5°–218.5°, nuclear magnetic resonance peaks at 39, 219, 319 and 418 hertz, and infrared absorption maxima at 2.76, 5.77, 7.14 and 8.00 microns.

EXAMPLE 17

To a solution of 150 parts of ammonium acetate and 105 parts of acetic acid, under nitrogen and heated to about 100°, is added 10 parts of 17β-hydroxy-2-oxaestra-1(10), 4-dien-3-one. The reaction mixture is refluxed for 26 hours after which time it is cooled and 600 parts of water added with stirring. The resultant precipitate is filtered and the aqueous mother liquors, after acidification, are extracted with chloroform. The extracted residue and precipitate are combined and refluxed in 47.5 parts of methyl alcohol and 31.6 parts of 5% sodium hydroxide solution for ½ to 1 hour. Solvent removal and neutralization with dilute hydrochloric acid results in a precipitate which is filtered to yield the desired 17β-hydroxy-2-azaestra-1(10), 4-dien-3-one. Absorption maxima in the infrared at 2.76, 2.94 and 6.00 microns characterize the product. It is also characterized by absorption peaks at 48, 178, 232, 409 and 462 hertz in the nuclear magnetic resonance spectrum, and absorption at 306 and 230 millimicrons in the ultraviolet region.

EXAMPLE 18

To 4.55 parts of 17β-hydroxy-2-azaestra-1(10), 4-dien-3-one in 39.3 parts of pyridine is added 21.6 parts of acetic anhydride. The mixture is warmed slightly to effect solution of the steroid and then stirred at room temperature for 3 hours. subsequent addition of 100–125 parts of water stirring for 1 hour, and filtering and drying the resultant precipitate produces the desired 17β-acetoxy-2-azaestra-1(10),4-dien-3-one. Spectroscopic absorption characteristics of this product are presented in Example 8.

EXAMPLE 19

To a mixture of 8 parts of 17β-hydroxy-2-oxaestra-1(10),4-dien-3-one and 119 parts of acetone, cooled to 0°–5°, is added 8.5 parts by volume of 4 N aqueous chromic acid over a 15 minute period, and the solution is stirred, while maintaining the above temperature, for 45 additional minutes. The excess reagent is destroyed with isopropyl alcohol, and the volume of the solution is reduced under vacuum to ½ to ⅓ of that of the original. A precipitate is formed with the addition of water, and, after subsequent stirring, washing, drying, and filtering, 2-oxaestra-1(10),4-dien-3,17-dione is isolated. The pure product exhibits absorption peaks at 5.76, 6.10 and 6.50 microns in the infrared spectrum and is further characterized by maxima at 57, 168, 366 and 440 hertz in the nuclear magnetic resonance spectrum. The product also absorbs at 299 millimicrons in the ultraviolet spectrum and melts at about 205°–211° with decomposition.

EXAMPLE 20

To a heated solution, at about 100°, of 52.5 parts of acetic acid and 75 parts of ammonium acetate is added 5 parts of 2-oxaestra-1(10),4-diene-3,17-dione. The mixture is refluxed under a nitrogen atmosphere for 26 hours, after which time 400 parts of water is added. The resulting precipitate is filtered to afford 2-azaestra-1(10),4-diene-3,17-dione. The characteristic infrared absorption spectrum for 2-azaestra-1(10),4-diene-3,17-dione has maxima at 2.93, 5.75, 6.01 and 6.16 microns. This product is also characterized by absorption maxima in the nuclear magnetic resonance spectrum at 60, 185, 418 and 476 hertz, and is distinguished further by ultraviolet absorption peaks at 306 and 230 millimicrons.

EXAMPLE 21

To 1.5 parts of 2-azaestra-1(10),4-diene-3,17-dione in about 132 parts of benzene is added successively 0.5 part of silver carbonate and 2.05 parts of methyl iodide. This mixture is refluxed in darkness for 3 ½ hours and then filtered. The solvent is evaporated, and the resulting oil is solidified upon recrystallization from methanol to yield 3-methoxy-2-azaestra-1,3,5(10)-trien-17-one with a melting point of 139.5°–140.5°. Infrared maxima are observed at 5.73, 6.22, 6.70 and 7.18 microns, nuclear magnetic resonance maxima at 55, 234, 388 and 484 hertz, and ultraviolet maxima at 276 and 286 millimicrons. This compound can be represented by the following structural formula

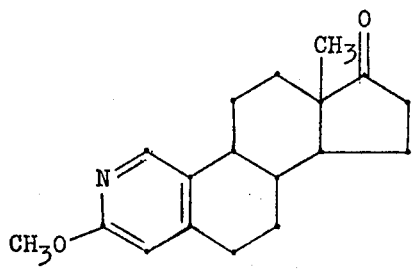

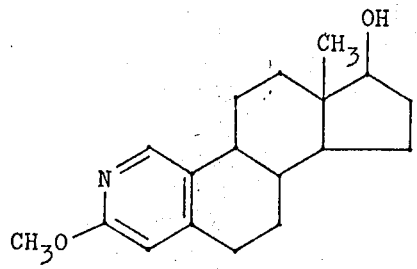

and melts at about 123°–125.5°.

EXAMPLE 22

To 4 parts of powdered potassium hydroxide in 8.9 parts of tetrahydrofuran, at about 0°, is added 0.73 part of ethanol, and the solution is stirred for about ½ hour while maintaining the temperature at about 0°. Acetylene gas, scrubbed with water and concentrated sulfuric acid, is passed through the solution at this temperature for 20–25 minutes. To this is added dropwise a solution of 0.90 part of 3-methoxy-2-azaestra-1,3,5(10)-trien-17-one in about 3 parts of tetrahydrofuran, and the resulting reaction mixture is stirred for 1 ½ hours at the temperature of 0°–5° while continually bubbling acetylene through the solution. Then water is added, and the aqueous phase extracted with ether. The extracts are washed with saturated salt solution and dried. Charcoal is added and, after filtering and solvent removal, the oily residue which remains is chromatographed over aluminum oxide to yield the crude product. Pure 17α-ethynyl-3-methoxy-2-azaestra-1,3,5(10)-trien-17β-ol is recrystallized from a hexane-acetone mixture and exhibits a melting point of 141°–145°. This product is further characterized by maxima at 53, 156, 233, 387 and 484 hertz in the nuclear magnetic resonance spectrum, maxima at 2.77, 3.03, 6.20, 6.70 and 7.15 microns in the infrared spectrum, and absorption maxima at 277 and 287 millimicrons in the ultraviolet spectrum. This compound is represented by the following structural formula

EXAMPLE 25

By substituting propionyl chloride and a reaction time of about 16 hours and otherwise proceeding according to the procedure of Example 18, 17β-propionoxy-2-azaestra-1(10),4-dien-3-one is obtained.

EXAMPLE 26

Upon substituting 17β-propionoxy-2-azaestra-1(10),4-dien-3-one in the procedure of Example 15, there is produced 3-methoxy-2-azaestra-1,3,5(10)-trien-17β-ol 17-propionate.

EXAMPLE 27

To 1.0 part of 3-methoxy-2-azaestra-1,3,5(10)-trien-17-one in about 30 parts of tetrahydrofuran, cooled to about 0° and under a nitrogen atmosphere, is added, dropwise over a period of about 10 minutes, 0.84 part of methyl magnesium bromide. The mixture is allowed to come to room temperature and is stirred for about 3–5 hours. Water is added, followed by enough ether and sodium hydroxide to form two layers, and the two phases are separated. The ethereal extracts are washed with saturated salt solution, dried, and upon solvent removal, an oil remains. Pure 3-methoxy-17α-methyl-2-azaestra-1,3,5(10)-trien-17β-ol is obtained after the oil is chromatographed over aluminum oxide. The compound, melting at about 115°–116.5°, is represented by the following structural formula

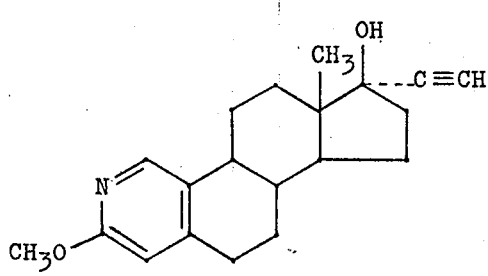

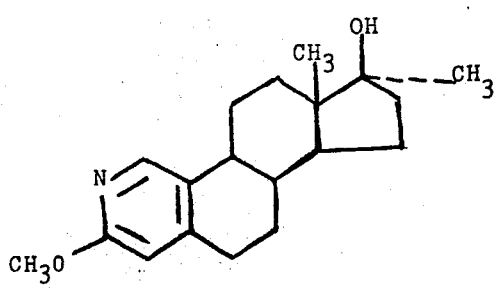

EXAMPLE 23

The substitution of an equivalent quantity of ethyl iodide in the procedure of Example 15 results in 3-ethoxy-2-azaestra-1,3,5(10)-trien-17β-ol 17-acetate.

EXAMPLE 24

When an equivalent quantity of 17β-hydroxy-2-azaestra-1(10),4-dien-3-one is substituted in the procedure of Example 15, 3-methoxy-2-azaestra-1,3,5(10)-trien-17β-ol is produced. This compound is represented by the following structural formula

EXAMPLE 28

An equivalent quantity of 1-propynyl magnesium bromide is substituted in the process of Example 27, and 3-methoxy-17α-(1-propynyl)-2-azaestra-1,3,5(10)-trien-17β-ol is produced.

EXAMPLE 29

Substitution of an equivalent quantity of ethyl magnesium bromide in the procedure of Example 27 yields 17α-ethyl-3-methoxy-2-azaestra-1,3,5(10)-trien-17β-ol.

EXAMPLE 30

A solution of 5.0 parts of 2-azaestra-1(10), 4-diene-3,17-dione, 3.2 parts of silver carbonate and 16 parts of cyclopentyl iodide in 440 parts of benzene is refluxed in the absence of light and under a nitrogen atmosphere for about 16 hours. The solution then is filtered through diatomaceous earth and the solvent removed under reduced pressure to afford a solid residue. The solid residue is dissolved in about 50 parts of hot acetone to form a solution which is allowed to cool slightly, treated with charcoal and filtered through diatomaceous earth. The recovered filtrate is cooled further to yield, after solvent removal, pure 3-cyclopentyloxy-2-azaestra-1,3,5(10)-trien-17-one, melting at about 182°–183°, and represented by the following structural formula

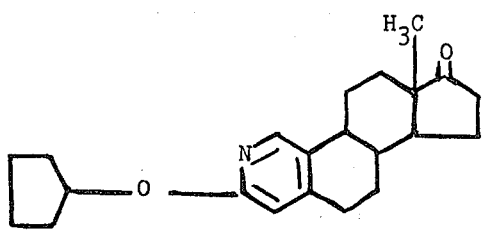

This compound is characterized further by absorption peaks in the ultraviolet specturm at about 222 and 279 millimicrons.

EXAMPLE 31

Acetylene gas, scrubbed with water and sulfuric acid, is bubbled for one-half hour through 50 parts of freshly distilled tetrahydrofuran, cooled to −78° under a nitrogen atmosphere. Then 10 parts by volume of a solution of 3N ethyl magnesium bromide in ether is added and the cooling bath is removed. After one-half hour, 2.0 parts of 3-cyclopentyloxy-2-azaestra-1,3,5(10)-trien-17-one in 20 parts of tetrahydrofuran is added over a 10 minute period. The reaction mixture is stirred at room temperature for 3 ½ hours and 20 parts by volume of 1N hydrochloric acid is added. The aqueous and organic layers which form are separated and the aqueous layer is extracted several times with ether. The combined extracts are washed with saturated sodium chloride, dried over anhydrous sodium sulfate and filtered. Then, the filtrate is evaporated to leave an oil which is taken up in ether. Hexane is added, until the solution becomes turbid. That solution is treated with charcoal and, after filtering through diatomaceous earth, the solvent is removed to yield, as an oil, 3-cyclopentyloxy-17α-ethynyl-2-azaestra-1,3,5(10)-trien-17β-ol. That compound is represented by the following structural formula

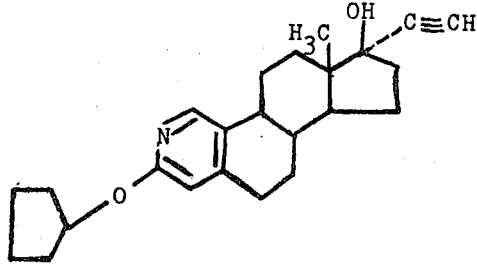

EXAMPLE 32

Substitution of an equivalent quantity of cyclooctyl iodide in the procedure of Example 30 affords 3-cyclooctyloxy-2-azaestra-1,3,5(10)-trien-17-one.

EXAMPLE 33

When an equivalent quantity of 3-cyclopentyloxy-2-azaestra-1,3,5(10)-trien-17-one is substituted in the procedure of Example 27, there is afforded 3-cyclopentyloxy-17α-methyl-2-azaestra-1,3,5(10)-trien-17β-ol.

EXAMPLE 34

By substituting an equivalent quantity of cyclobutyl iodide in the procedure of Example 30, there is afforded 3-cyclobutyloxy-2-azaestra-1,3,5(10)-trien-17-one.

EXAMPLE 35

When an equivalent quantity of 3-cyclobutyloxy-2-azaestra-1,3,5(10)-trien-17-one is substituted in the procedure of Example 31, there is obtained 3-cyclobutyloxy-17α-ethynyl-2-azaestra-1,3,5(10)-trien-17β-ol.

EXAMPLE 36

To a solution of ethyl magnesium bromide, prepared from 8.2 parts of ethyl bromide and 1.8 parts of magnesium turnings in 150 parts by volume of tetrahydrofuran, is added a solution containing 12 parts of 3-tetrahydropyran-2'-yloxyprop-1-yne in 100 parts by volume of tetrahydrofuran. That reaction mixture is heated at the relux temperature for about 5 minutes, then is allowed to stand at room temperature for about 2 hours. At the end of that time a solution containing 10 parts of 3-methoxy-2-azaestra-1,3,5(10)-trien-17-one in 150 parts by volume of tetrahydrofuran is added. The resulting reaction mixture is stirred at room temperature for about 2 hours, then is poured carefully into saturated aqueous ammonium chloride. The resulting product is isolated by extraction of that aqueous mixture with methylene chloride.

To a suspension consisting of 10 parts of lithium aluminum hydride and 200 parts by volume of ether is added, dropwise with stirring, 10 parts of the latter product, i.e.3-methoxy-17α-(3-tetrahydropyran-2'-yloxypropynyl)-2-azaestra-1,3,5(10)-trien-17β-ol, dissolved in 200 parts by volume of ether. The resulting suspension is heated at the reflux temperature with stirring for about 2 ½ hours, at the end of which time the excess reducing agent is decomposed by the addition of acetone. The metal salts are precipitated by the addition of saturated aqueous sodium sulfate and solid sodium sulfate and the resulting mixture is filtered. The filter cake is washed with methylene chloride and the filtrate is dried over anhydrous sodium sulfate and evaporated to dryness under reduced pressure. The resulting residue is mixed with 200 parts by volume of a 1% methanolic hydrogen chloride solution and that mixture is allowed to stand at room temperature for about 15 minutes. At the end of that time approximately 2,000 parts of water is added and the aqueous mixture is extracted with methylene chloride. The organic extracts are washed with water, dried over anhydrous sodium sulfate and evaporated to dryness under reduced pressure, thus affording 3-methoxy-17α-propadienyl 2-azaestra-1,3,5(10)-trien-17β-ol, represented by the following structural formula

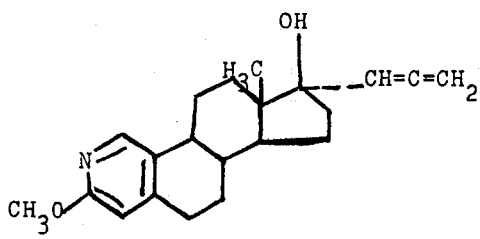

EXAMPLE 37

By substituting an equivalent quantity of 3-cyclopentyloxy-2-azaestra-1,3,5(10)-trien-17-one in the procedure of Example 36, there is afforded 3-cyclopentyloxy-17α-propadienyl-2-azaestra-1,3,5(10)-trien-17β-ol.

What is claimed is:

1. A compound of the formula

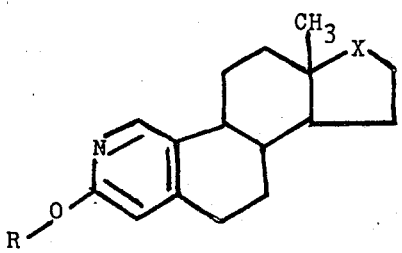

wherein R is a lower alkyl group having 1 to 7 carbon atoms inclusive or a cycloalkyl group having 4–8 carbon atoms inclusive, and X is a carbonyl group or a group of the formula

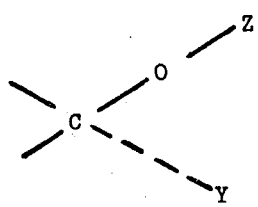

wherein Y is hydrogen, a lower alkyl group having 1 to 7 carbon atoms inclusive, a lower 1-alkynyl group having 2 to 7 carbon atoms inclusive or a propadienyl group and Z is hydrogen or a lower alkanoyl group having 1 to 7 carbon atoms inclusive.

2. As in claim 1, a compound of the formula

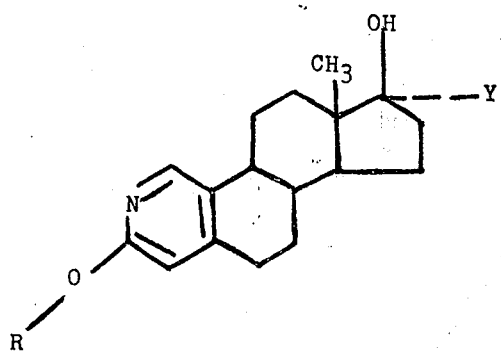

wherein R is a lower alkyl group having 1 to 7 carbon atoms inclusive or a cycloalkyl group having 4–8 carbon atoms inclusive and Y is a lower alkyl group having 1 to 7 carbon atoms inclusive.

3. As in claim 1, a compound of the formula

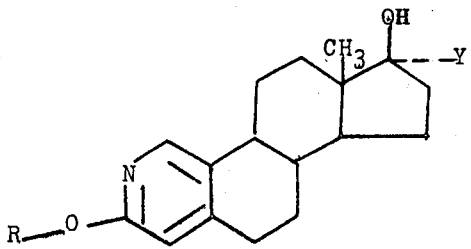

wherein R is a lower alkyl group having 1 to 7 carbon atoms or a cycloalkyl group having 4–8 carbon atoms inclusive and Y is a lower 1-alkynyl group having 2 to 7 carbon atoms inclusive.

4. As in claim 1, a compound of the formula

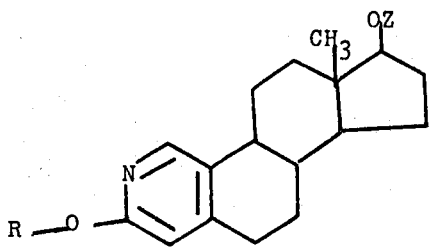

wherein R is a lower alkyl group having 1 to 7 carbon atoms inclusive or a cycloalkyl group having 4–8 carbon atoms inclusive and Z is a lower alkanoyl group having 1 to 7 carbon atoms inclusive.

5. As in claim 1, the compound which is 3-methoxy-2-azaestra-1,3,5(10)-trien-17-one.

6. As in claim 1, the compound which is 3-methoxy-2-azaestra-1,3,5(10)-trien-17β-ol.

7. As in claim 1, the compound which is 17α-ethynyl-3-methoxy-2-azaestra-1,3,5(10)-trien-17β-ol.

8. As in claim 1, the compound which is 3-methoxy-17α-methyl-2-azaestra-1,3,5(10)-trien-17β-ol.

9. As in claim 1, the compound which is 3-methoxy-2-azaestra-1,3,5(10)-trien-17β-ol 17-acetate.

10. As in claim 1, the compound which is 3-cyclopentyloxy-2-azaestra-1,3,5(10)-trien-17-one.

11. As in claim 1, the compound which is 3-cyclopentyloxy-17α-ethynyl-2-azaestra-1,3,5(10)-trien-17β-ol.

* * * * *